United States Patent
Berlingerio et al.

(10) Patent No.: US 9,397,904 B2
(45) Date of Patent: Jul. 19, 2016

(54) SYSTEM FOR IDENTIFYING, MONITORING AND RANKING INCIDENTS FROM SOCIAL MEDIA

(71) Applicant: International Business Machines Corporation, Armonk, NY (US)

(72) Inventors: Michele Berlingerio, Noicattaro (IT); Xiaowen Dong, Lausanne (CH); Aris Gkoulalas-Divanis, Dublin (IE); Dimitrios Mavroeidis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 14/143,949

(22) Filed: Dec. 30, 2013

(65) Prior Publication Data

US 2015/0186378 A1 Jul. 2, 2015

(51) Int. Cl.
| | |
|---|---|
| *G06F 17/30* | (2006.01) |
| *G06Q 50/00* | (2012.01) |
| *H04L 12/26* | (2006.01) |
| *H04L 12/18* | (2006.01) |

(52) U.S. Cl.
CPC .......... *H04L 43/04* (2013.01); *G06F 17/30864* (2013.01); *G06Q 50/01* (2013.01); *H04L 12/1813* (2013.01)

(58) Field of Classification Search
CPC .................. G06F 17/30864; G06Q 50/01
See application file for complete search history.

(56) References Cited

U.S. PATENT DOCUMENTS

| | | | |
|---|---|---|---|
| 8,234,310 B2 * | 7/2012 | Pottenger | G06F 17/3089 707/802 |
| 8,291,076 B2 * | 10/2012 | Luna | A61B 3/10 709/203 |
| 8,463,789 B1 | 6/2013 | Joshi et al. | |
| 8,732,240 B1 * | 5/2014 | Tomkins | G06F 17/30041 709/204 |
| 8,738,613 B2 * | 5/2014 | Ahmed | G06F 17/30867 707/723 |
| 8,775,406 B2 † | 7/2014 | Gross | |
| 8,943,053 B2 * | 1/2015 | Kristiansson | G06Q 10/10 707/732 |

(Continued)

FOREIGN PATENT DOCUMENTS

| | | |
|---|---|---|
| WO | 2011/025460 A1 | 3/2011 |
| WO | 2013/086931 A1 | 6/2013 |

*Primary Examiner* — Cheryl Lewis

(57) ABSTRACT

A system and method for detecting, monitoring and ranking incidents from social media streams comprises detecting incidents from social media streams and continuously monitoring the incidents, calculating a current-score for each of the incidents, determining a projected-score indicating an expected evolution for each of the incidents, ranking the incidents based on the current-scores of the incidents, predicting ranking of the incidents based on the projected-score of the incidents, and updating the predicted ranking responsive to new input detected about the incidents from the social media streams. In one aspect, the current-score is computed in accordance with characteristics of the incident comprising one or more of social impact assessment, dynamic location of users, human perception, and social network features. In one aspect, the current-score is calculated using one or more diffusion models based on one of a type of the incident, and similar incidents for which their evolution is known.

18 Claims, 5 Drawing Sheets

(56) References Cited

U.S. PATENT DOCUMENTS

| | | | |
|---|---|---|---|
| 9,177,065 B1* | 11/2015 | Ben-Yair | G06F 17/30867 |
| 2010/0076806 A1* | 3/2010 | Grichnik | G06Q 10/06315 |
| | | | 705/7.25 |
| 2011/0314007 A1 | 12/2011 | Dassa et al. | |
| 2012/0102113 A1* | 4/2012 | Chartier | G06Q 10/10 |
| | | | 709/204 |
| 2012/0256745 A1 | 10/2012 | Piett et al. | |
| 2013/0100268 A1 | 4/2013 | Mihailidis et al. | |
| 2013/0103667 A1* | 4/2013 | Minh | G06F 17/30864 |
| | | | 707/709 |
| 2013/0124653 A1* | 5/2013 | Vick | H04L 51/32 |
| | | | 709/206 |
| 2013/0238356 A1 | 9/2013 | Torii et al. | |
| 2014/0087886 A1* | 3/2014 | Osvald | A63F 13/12 |
| | | | 463/42 |
| 2014/0316911 A1† | 10/2014 | Gross | |
| 2015/0310018 A1* | 10/2015 | Fan | G06F 17/30 |
| | | | 707/734 |

\* cited by examiner
† cited by third party $$W_{ij} = Z_j^{Tr} \exp(-\beta_r d_{ij}) \exp\left(-\left\lfloor \frac{\gamma_r Q_j}{D_j} \right\rfloor\right) \quad \underset{401}{\phantom{X}}$$

$$W_{ij}^e(t) = \frac{1}{L_r} \sum_{l=0}^{L_r - 1} W_{ij}(t - l\delta t) \quad \underset{403}{\phantom{X}}$$

$$N_i(t) = \eta I_i(t) p_i^\mu \frac{\sum_j W_{ij}(t)}{1 + \sum_j W_{ij}(t)} \quad \underset{405}{\phantom{X}}$$

$$D_j(t) = \sum_i \frac{R_i(t) W_{ij}^e(t)}{\sum_k W_{ik}^e(t)} \quad \underset{407}{\phantom{X}}$$

$$C_j(t) = \tau \sum_j S_{ij}(t) \left(1 - \exp\left(-\left\lfloor \frac{Q_j}{D_j} \right\rfloor\right)\right) \quad \underset{409}{\phantom{X}}$$

FIG. 4

SYSTEM FOR IDENTIFYING, MONITORING AND RANKING INCIDENTS FROM SOCIAL MEDIA

BACKGROUND

The present disclosure relates generally to the field of social media analytics.

Social media offer a good and constantly updated source of information about ongoing events in cities, e.g., riots, concerts, traffic, etc. These events or incidents can include activities involving groups of participants within a fixed geographic area. Moreover, social media offer a unique view to achieve situational awareness, e.g., direct assessment of social impact, based on elements such as mobile sensors not fixed to a location, social network features, and human perception.

Typically, situational awareness is computed from physical sensors, not capturing people's perceptions. In the course of incidents, people's perceptions with respect to different factors, e.g., criticality of a safety incident, user participation in a concert, etc., may change. However, the lack of real-time monitoring and ranking, both at the present time and in the near future, of incidents in a city with respect to user-selected measures of interest is problematic. A system capable of providing such monitoring and ranking of incidents, including projecting the ranking of the incidents in the future, could significantly help in performing resource allocation and acting promptly by, for example, city managers and/or police.

BRIEF SUMMARY

A novel computer implemented system and method for identifying, monitoring and ranking incidents from social media is presented. The method can comprise detecting incidents from social media streams and continuously monitoring the incidents, calculating a current-score for each of the incidents, determining a projected-score indicating an expected evolution for each of the incidents, ranking the incidents based on the current-scores of the incidents, predicting ranking of the incidents based on the projected-score of the incidents, and updating the predicted ranking responsive to new input detected about the incidents from the social media streams.

The system can comprise a memory device, a display device, and a hardware processor coupled to the memory device, the processor configured to: detect incidents from social media streams and continuously monitoring the incidents, calculate a current-score for each of the incidents, determine a projected-score indicating an expected evolution for each of the incidents, rank the incidents based on the current-scores of the incidents, predict ranking of the incidents based on the projected-score of the incidents, and update the predicted ranking responsive to new input detected about the incidents from the social media streams.

In one aspect, the current-score is computed in accordance with characteristics of the incident comprising one or more of social impact assessment, dynamic location of users, human perception, and social network features. In one aspect, the current-score is calculated using one or more diffusion models based on a type of the incident, and/or similar incidents for which their evolution is known. In one aspect, updating the predicted ranking comprises at least a user providing real-time feedback on the incident, which influences the prediction of the current state of the incident and, through the considered diffusion models, the incident's expected evolution. In one aspect, updating the predicted ranking is performed automatically based on the expected evolution of the incident based on the one or more diffusion models. In one aspect, the predicted ranking is displayed on a display device.

BRIEF DESCRIPTION OF THE DRAWINGS

FIG. 4 is an exemplary diffusion model in one embodiment.

DETAILED DESCRIPTION

An embodiment of the system and method for detecting, monitoring and ranking incidents from social media is presented. The ranking includes both a current ranking and a projected ranking so that the inventive system and method has the ability to output, e.g., display, a ranked list of incidents, together with a projection of a future ranking of the incidents. In one embodiment, the system and method can determine current ranking importance and/or criticality of incidents, and can use this information to forecast future criticality of the incidents, including forecasting when the criticality of an incident will change.

Figure 1:
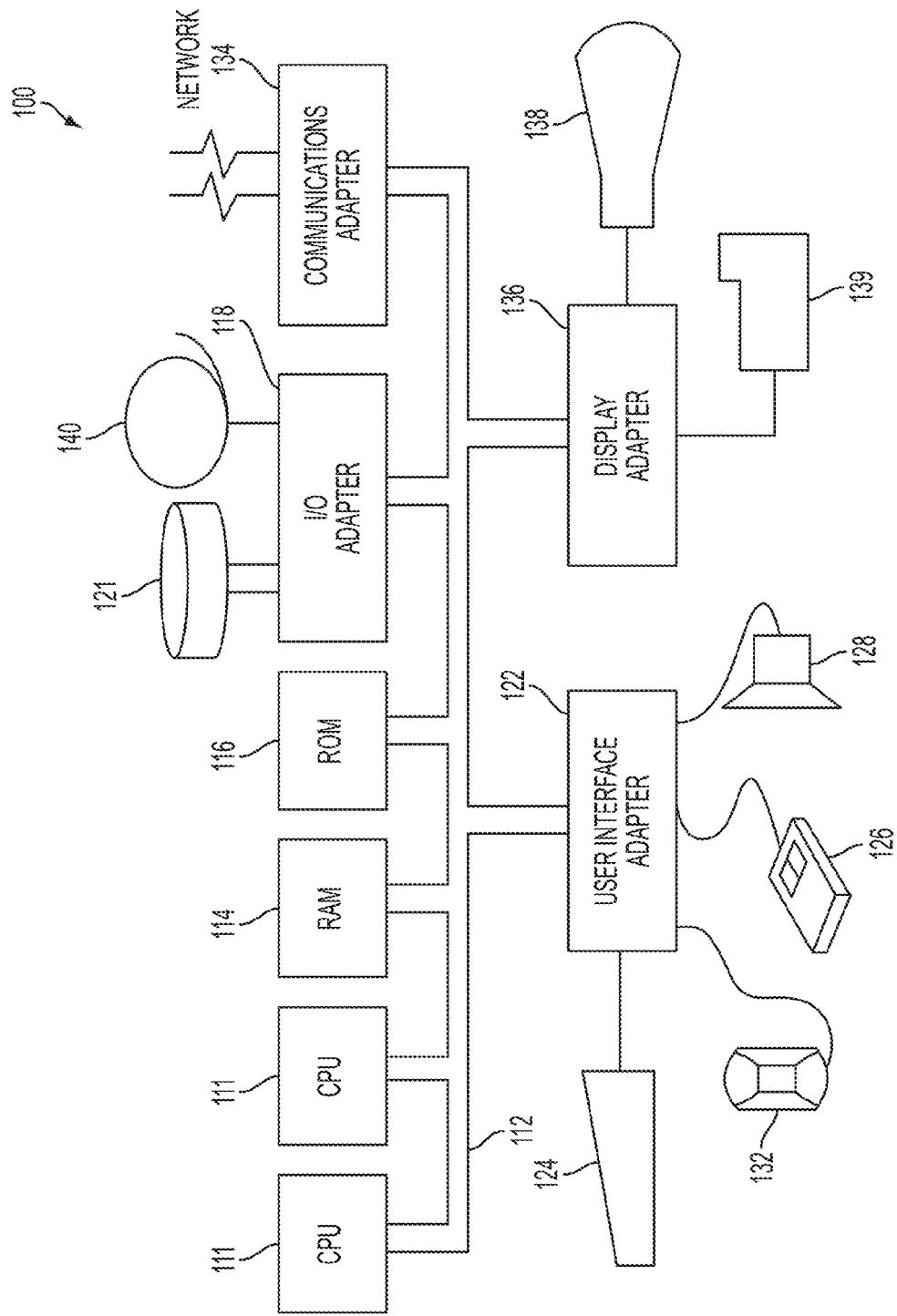
FIG. 1 is an exemplary system architecture of the present disclosure in one embodiment.

FIG. 1 illustrates an exemplary hardware configuration of a computing or mobile device computing system infrastructure 100 in which the present methods are run. The hardware configuration preferably has at least one processor or central processing unit (CPU) 111. The CPUs 111 are interconnected via a system bus 112 to a random access memory (RAM) 114, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, disk drive device 132, and/or other user interface device to the bus 112), a communication adapter 134 for connecting the system 100 to a data processing network, the Internet, an Intranet, a local area network (LAN), etc., and a display adapter 136 for connecting the bus 112 to a display device 138 and/or printer 139 (e.g., a digital printer of the like).

Figure 2:
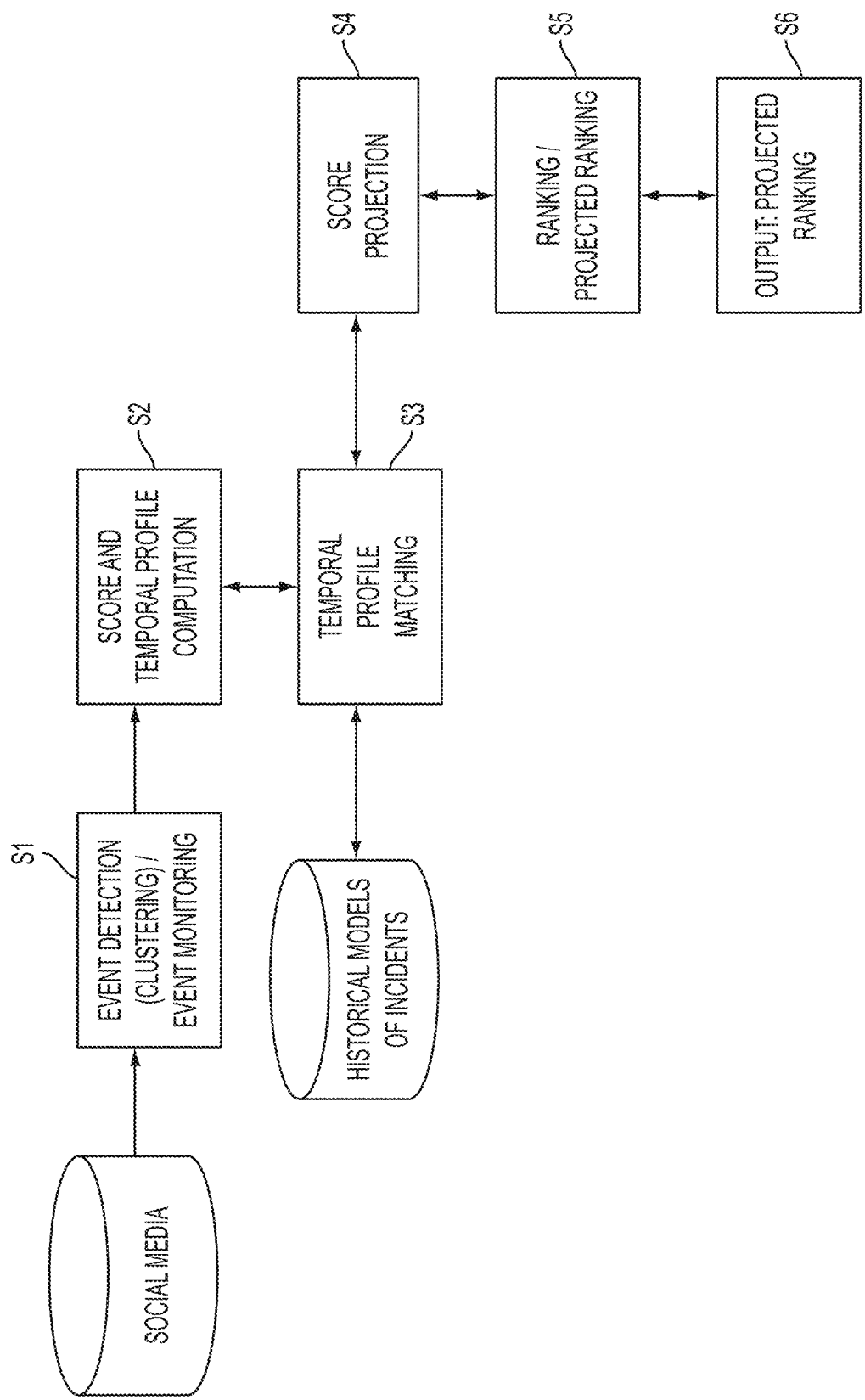
FIG. 2 is a flow diagram illustrating the flow of the inventive method in one embodiment.

In one embodiment, computing system 100 is programmed to perform the method processing steps shown in FIG. 2. For example, the data can be stored in RAM 114 and/or in disk units 121 or tape drives 140. The CPUs 111 can perform method processing steps such as scoring events, ranking events, etc.

An embodiment of the system and method can operate using social media text and data, e.g., from tweets, blogs, text messages, web-pages, etc., and its unique sensors. One type of sensor includes physical sensors such as cameras, weather sensors, traffic sensors, etc. In addition, information can be sensed from social media. This information can be analyzed using, for example, Natural Programming Language (NPL) analysis of text content, complex network analysis, image analysis, and sentiment analysis. Complex network analysis can include, for example, spatio-temporal network analysis. Image analysis can include, for example, analysis of photographs and other images attached to or associated with texts. Social media add a new dimension of information; the various sensors can provide direct assessment of social impact, act as mobile sensors not fixed to a location, and/or provide social network features based on human perception.

Detection of an event or incident can be performed using, among other things, text analysis of the tweet content, and spatio-temporal network analysis of tweets, such as the number of tweets in the area that report the event. In addition, image analysis of possible photo attachments, and/or sentiment analysis of tweet text can be used. Alternatively, events may be detected through other sources, such as through calls to emergency services (E-911) or onsite cameras, in which case the event is manually recorded in the system and the corresponding area of the event is subsequently actively monitored by the system for incoming information from social media that relates to this incident.

Assessment of an event's criticality can be performed with a Diffusion Modeling of criticality, discussed in detail below, using social media. The special characteristics of social media sensors discussed above can be used for tuning the parameters of criticality/diffusion of emergency situations, such as the spreading probability of a Forest Fire model. NLP analysis can be used to determine context. The data obtained by image analysis and/or sentiment analysis can also be used in the assessment. The criticality of an event can be computed as a function of various inputs related to the monitored incident, such as the incident type (certain incidents can be considered as more critical than others), the number of associated tweets and their content, the criticality of similar historical incidents, e.g., historical related incidents, recorded in the system (how these incidents evolved, how severe they were in their course of evolution, etc.), sentiment analysis of the tweets, number of people reporting the incident within a time window, etc.

FIG. 2 shows an exemplary method of the present invention. Initially, in step S1, event detection occurs, for example by clustering tweets that refer to the same incident. This can be achieved through text analysis of the received tweets, possibly by also employing concept ontologies. In addition, or in conjunction with event detection, event monitoring occurs, so that events initially detected in step S1 can be monitored immediately after detection and until they become unimportant. Detected and/or monitored events can be referred to as "incidents".

In step S2, the system performs scoring of each incident, e.g., by calculating a "current-score", and the system (optionally) computes a temporal profile for each incident. The score computed at step S2 regards the current state of the monitored incident A, because the information about incident A comes only in real time and this real time information is used to maintain how the incident evolves. The score of the incident can be computed taking into account data from the social media sensors and the data can include characteristics such as social impact assessment, dynamic location of users, human perception, social network features, etc. For example, the social impact of an incident can be measured based on the expected effect of the incident to citizens. Thus, an armed robbery will be considered more important than a traffic accident with no casualties. Police prioritize the various incidents based on their importance and this priority can be provided as input to the system to assess social impact. As another contributing factor to the score of an incident, the humans' perception about the incident can be calculated, for example, by performing sentiment analysis on the received tweets by calculating the proximity of the user to the reported incident, etc. Sentiment analysis on received tweets can be based, for example, on the wording used by the user, any punctuation marks such as exclamation points that appear in the text, etc.

Each of the above factors can be assigned a weight and the overall score of the incident can be computed as the weighted sum of the different contributing factors. The score can also be computed according to a type of the incident, such as a riot, a concert, a fire, etc. The temporal profile of an incident can be computed in real-time (as an optional step), based on the information that becomes available through social media about the incident. When new information becomes available about the incident, the score of the incident is recalculated and the evolution of the score of the incident is recorded, thereby creating a temporal profile capturing the evolution of the incident.

Figure 3:
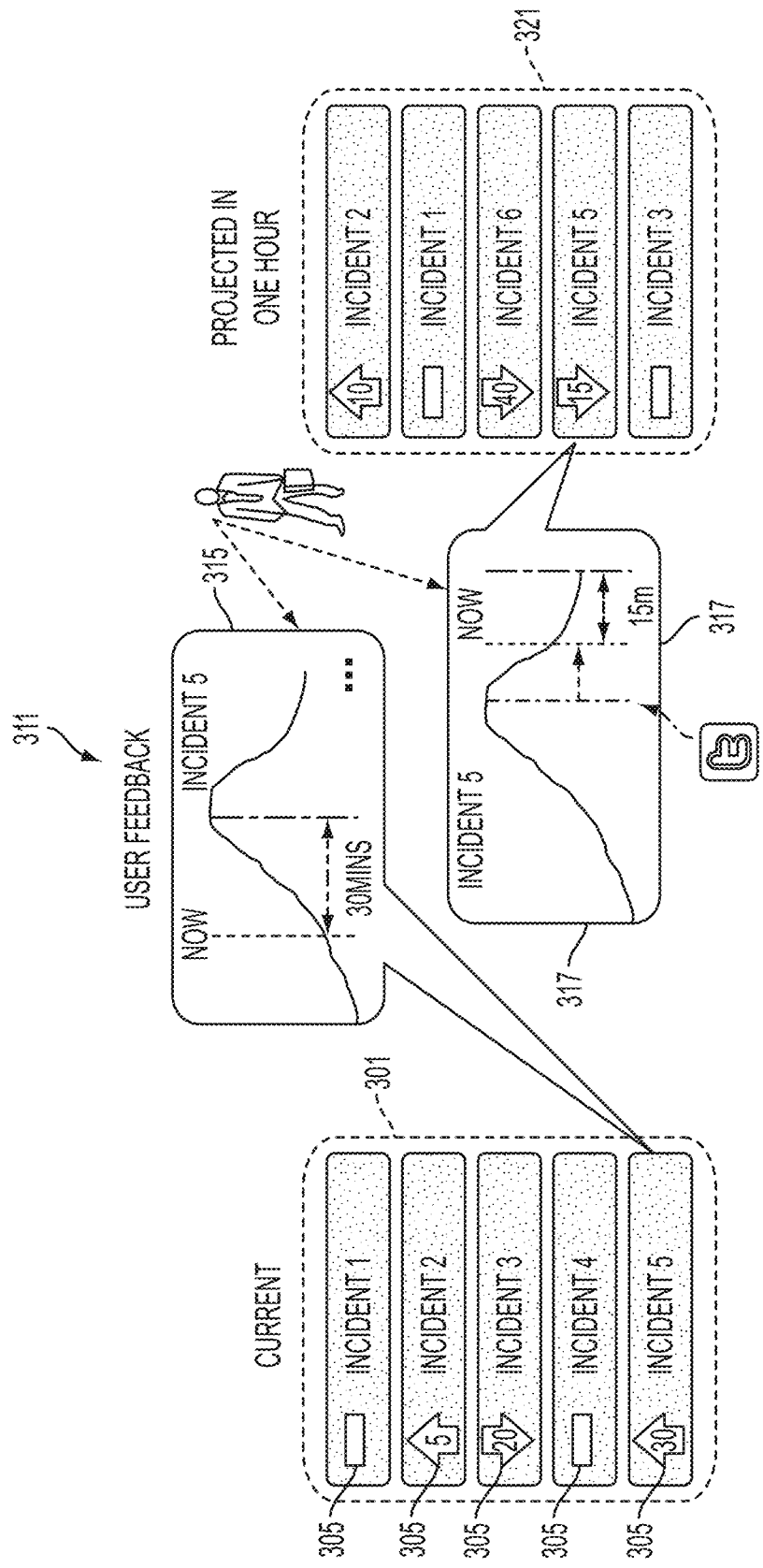
FIG. 3 is an exemplary display screen.

In step S3, the system performs temporal profile matching by either matching the temporal profile of the incident (computed in step S2) to a diffusion model or to a historical related incident that is stored in the knowledge base, or by positioning in time the current-score of the incident to a diffusion model (or historical incident). For example, an incident's temporal profile can be used to determine whether a matching event exists with some past profiles and/or historical models of events or incidents in the knowledge base. In one aspect, given the current-score of an incident A that is monitored in real time and a historical incident B, e.g., a historical related incident, (whose evolution is known), the current state of A can be mapped in B. For example, as shown in FIG. 3 (at 315), Incident 5 is the historical incident B (or it can be a diffusion model of a similar incident—it's the same). Then, in the timeline of Incident 5, the current incident A can be positioned (to capture where is "now", shown as the dotted line). When this matching is performed accurately, then one can estimate how incident A is going to progress and/or evolve, using the timeline of incident B. Accordingly, the current-score of incident A can be positioned in time to the timeline of the historical incident (or diffusion model) B.

In step S4, a score projection, e.g., "projected-score" of the incident can be computed. Accordingly, in step S4, the score of incident A after some amount of time (i.e., in the future) is estimated, as shown in FIG. 3 (at 315). After time incident A is positioned to the historical incident B (and thus the "now" point is derived), this knowledge, e.g., "now" point, can be used to say that "in 30 minutes the criticality of incident A is expected to significantly grow", as shown in FIG. 3 (at 317). This expectation or forecast is based on incident B, which is a historical related incident having a known progression and/or evolution.

The ranking based on the current-score (computed in step S2) reflects the relative criticality of each incident (to the others) in real time. The predicted ranking (computed in step S4) reflects the relative criticality of each incident in the future, e.g., after a certain amount of time. An example is shown in FIG. 3, as follows and further described below. Assume 5 incidents have been determined and for each of these the "now" is found based on each incident's respective historical related incidents (or diffusion models). The current score (the "now") of the incidents to create a ranking that reflects the current situation/criticality of the incidents. This is the ranking at 301 in FIG. 3. However, having identified the position ("now") of each incident in its respective historical incident and/or diffusion model, how the criticality of each incident will evolve in an amount of time, such as, for example, in 30 minutes can be predicted or forecast. This can lead to a new ranking where some of the incidents have become more critical and/or more important, whereas others have become less critical and/or less important. This is the ranking shown at 321 in FIG. 3; it is called the "predicted ranking".

In step S5, the system performs a ranking of incidents based on current-scores, and a predicted ranking based on the score projection.

In step S6, the output of the ranking and projected ranking can occur. For example, the projected ranking can be displayed on a display device 138 (FIG. 1). Various outputs can be produced and displayed, if desired. In addition, real-time ranking of monitored incidents can be automatically updated and displayed, based on their currently calculated scores, responsive to new input received about each incident and/or expected evolution of the incident as reported by a corresponding diffusion model(s). Diffusion models are discussed in more detail below. In one embodiment, a user of the system and method can provide, in real-time, feedback on the prediction accuracy offered by the corresponding diffusion model(s). Such feedback can be used to improve the subsequent ranking of the monitored incidents and/or similar incidents. For example, the feedback can be used to update the positioning of the current state of the incident with respect to the diffusion model and/or to modify a historical model so that the rankings from these updated models are more accurate.

FIG. 3 shows, in one embodiment of the present invention, output of a first column or list labeled "CURRENT" 301 containing five incidents: Incident 1, Incident 2, Incident 3, Incident 4 and Incident 5, a pair of messages labeled "User feedback" 311, and a third column or list labeled "PROJECTED in One Hour" containing the incidents in a different order 321. In another embodiment, the "PROJECTED in One Hour" incidents may be in the same order as the "CURRENT" incidents. Notice that certain incidents may have become unimportant in the meantime, thus they are not part of the list labeled "PROJECTED in One Hour", while other events may have been discovered in the meantime (such as Incident 6), thus these events discovered in the meantime were not part of the list labeled "CURRENT".

In FIG. 3, each incident, e.g., Incident 1, Incident 2, Incident 3, Incident 4 and Incident 5, had been detected from social media data. An indicator 305, which is included with each incident, indicates time, e.g., an integer, in which the criticality of the incident is projected to change. An upward arrow indicator indicates that the criticality of the incident is expected to increase, and a downward arrow indicates that the criticality of the incident is expected to decrease. For example, the indicator for Incident 2 is an upward arrow containing a "5" which indicates that the criticality of Incident 2 is expected to increase in 5 time units, e.g., 5 minutes. Similarly, the indicator for Incident 3 is a downward arrow containing a "20" indicating that the criticality of Incident 3 is expected to decrease in 20 time units, e.g., 20 minutes. One indicator 305, shown as a rectangle shape, for example, indicates no change is projected. The change of criticality causes the re-ordering or re-ranking of the incidents, so that Incident 2 appears above Incident 1 in the "PROJECTED in One Hour" 321 column. The change of criticality is computed with the help of historical related incidents for which information is maintained in the knowledge base of the system and/or relevant diffusion models, based on how the corresponding (related) events progressed in the course of time. For example, in FIG. 3 at 315, Incident 5 is reported to have a certain current-score (shown in position "now"). Using the historical incident (or a diffusion model) for which its criticality evolved in time is known, it can be predicted that Incident 5 is expected to reach its highest level of criticality (score) after 30 minutes, since this is how much it took the historical incident to reach its maximum level of criticality when it was at position "now". By performing the same computation for each incident in the ranked list of 301, a projected ranking of the incidents in the future can be derived, as shown in FIG. 3 at 321.

The "User feedback" 311 in FIG. 3 includes current information about an event 315, e.g., Incident 5, and projected information about the event 317. The "PROJECTED in One Hour" 321 reflects the information shown in "User feedback". Specifically, current event information 315 shows that the score projection or score of the event e.g., Incident 5, is projected or forecast to increase in the next 30 minutes. In addition, the projected event information 317 shows that the score of the event, e.g., Incident 5, is forecast to decrease in the 15 minutes after the current 30 minutes, based on input from social media, e.g., Twitter®, etc. The determination of the event scores and temporal profile computation (step S2), is described in detail below. The forecasting of when the criticality of an incident is expected to occur is performed with the help of the diffusion model and/or any historical incidents to which the current incident was matched. Based on the evolution of these similar incidents and the time that it took for their criticality to change, the system can predict when the criticality of the currently monitored incident is expected to change. Hence, after the matching of the current incident to the historical related incident (or diffusion model) has been achieved, forecasting is simple as it is based on the temporal profile of the historical incident. For example, the timeline shown in FIG. 3 at 315 depicts the score of the historical incident at different times. The "now" location depicts the current score of the incident (i.e., it positions the incident on the timeline). Then, one can identify and forecast that in 30 minutes, for example, the score and/or criticality of the monitored incident is expected to reach its maximum.

The projected ranking may be used to prioritize the reaction to emergency situations. For example, if police know in advance that Incident 1 is important now, but will be less important in 30 minutes, and that Incident 2 is less important now but will become more critical in 30 minutes, and the average police emergency response time is 30 minutes, then Incident 2 may become the most important incident to react to.

In one embodiment, the individual event scores and/or score projections may be calculated by using spatio-temporal diffusion models. Typically, a diffusion model attempts to capture and model a temporal phenomenon, such as the adoption of a new product as word of mouth travels through the target population and external communications attempt to influence demand. In the present invention, a diffusion model can be used to calculate the expected evolution of an incident. That is, the diffusion model captures how certain events (such as fires, floods, burglaries, etc.) progress over time and space, and can be used to estimate how a given incident is expected to progress. In one embodiment, historical incidents can be used to compute these models. In one embodiment, diffusion models help to score the incidents based on their expected spatio-temporal evolution and to estimate approximately when the score will change.

Various sources can provide input for the event detection (step S1) and for the score and temporal profile computation step (step S2). Some exemplary sources can include social media streams, such as Twitter®, Facebook®, Foursquare®, etc. Incoming information about the monitored incidents (such as newly arrived "tweets", e.g., data streamed from Twitter®) can help to improve the ranking of these monitored events by the system.

In one embodiment, criticality as a scoring function can be computed as follows.

$$\text{Criticality}=f(\text{incident-type},\text{associated tweets},\text{diffusion model})$$

where incident-type, associated tweets and diffusion model are as follows. Incident-type can be computed, for example, by using keywords mentioned in tweets, concept ontologies that assign keywords into event types, as well as NLP tools that preprocess tweets to identify important terms. Associated tweets per incident can be similarly identified based on important keywords that are shared among tweets, including synonyms, as well as with the help of concept ontologies. Criticality can also be computed with the help of a diffusion model which considers similar historical incidents for which progression of the incident is already known. For example, if there is an incident of "fire in Phoenix Park", then the historical incident of a fire in Queen's Park can be used as a reference incident (diffusion model) when it is known that the fire in Queen's Park spread with rate X within Y hours and Queen's Park is "similar" to Phoenix Park, that is the two parks are about the same size, have the same types of trees, fire zones, etc.

In another example, if a "similar" incident is not known, the worst-case scenario can be employed. In this situation, the worst fire in a park can be used to compute the level of criticality for the incident "fire in Phoenix Park", and then this level can be adjusted based on the number and content of subsequently received tweets. Further, if available, other additional sources such as weather forecast information, city information, etc., can be used to influence the computation of criticality. For example, in the case of the "fire in Phoenix Park", weather forecast information that predicts that it will rain within the next hour in the corresponding area can lead to lowering the criticality of this incident.

In one embodiment, a diffusion model, such as the one shown in FIG. 4, can be used. The diffusion model of FIG. 4 employs equations for estimating the state and evolution of riot incidents, and focuses on rioters from area i that travel to location j and participate in a riot. Criticality of location j is defined in this model as the number of protesters in the location. Evolution of criticality involves predicting the number of protesters at a specific location. Computing state of criticality can be performed using text analysis of the tweets, sentiment analysis and image analysis. Based on this information, the number of rioters in location j, $D_j$ can be estimated. Computing the evolution of criticality can be performed using text analysis of the tweets, sentiment analysis and image analysis to learn and obtain knowledge for a knowledge base. In the equations shown in FIG. 4, $W_{ij}$ determines the "attractiveness" of location j to rioters from location I, $\alpha_r$, $\beta_r$, $\gamma_r$ are included in the "attractiveness" equation, $\eta$ is "Infection rate" and $\tau$ is Arrest rate.

The formulas included in FIG. 4 summarize the mathematical model for the London riots that was presented in "A Mathematical Model of the London Riots and their Policing", by T. P. Davies, H. M. Fry, A. G. Wilson and S. R. Bishop, *Scientific Reports*, 2013. The notation considers that a city is initially divided in a set of locations/areas, i.e. location 1, 2, 3, . . . , etc. Details of the formulas shown FIG. 4 are as follows.

$W_{ij}$ 401, attractiveness function, quantifies the attractiveness of location j for rioters residing in location I, where
$Q_j$ is the number of police officers in location j
$D_j$ is the number of rioters in location j.
$W_{ij}^e(t)$ 401 is described by Davis et al. as "Rather than incorporating the attractiveness function, $W_{ij}$, directly into the spatial interaction equations, we use its moving average over previous time steps. The values used to determine the assignments at a given time, referred to as effective attractiveness and denoted, are therefore the average values of $W_{ij}$ over the Lr most recent time steps in our discretised temporal scheme (which has intervals $\delta t$; when $t<(L_r-1)\delta t$, we 'pad' with the t=0 value)".
$N_i(t)$ 405 quantifies, at time t, the rate at which individuals from location i choose to participate in a riot.
$D_j(t)$ 407 is the number of rioters in location j at time t.
$C_i(t)$ 409 quantifies the rate at which individuals who originated from location i are arrested at time t.

Further,
$d_{ij}$ is the distance between locations i and j
$Z_j$ quantifies the "value" of a riot location
$\alpha_r$, $\beta_r$, $\gamma_r$ are parameters that are tuned using real-world data
$\eta$ denotes the infection rate
$I_i(t)$ quantifies, at time t, the inactive individuals from location I
$\rho_i$ is a measure of the deprivation in location i and $\mu$ an exponent that is calibrated using real-world data
$R_i(t)$ is the number of rioters whose residence is in location I
$S_{ij}(t)$ quantifies the number of protesters from location i who are participating in riots in location j at time t
$\tau$ denotes an arrest rate parameter to be tuned using real-world data.

Figure 5:
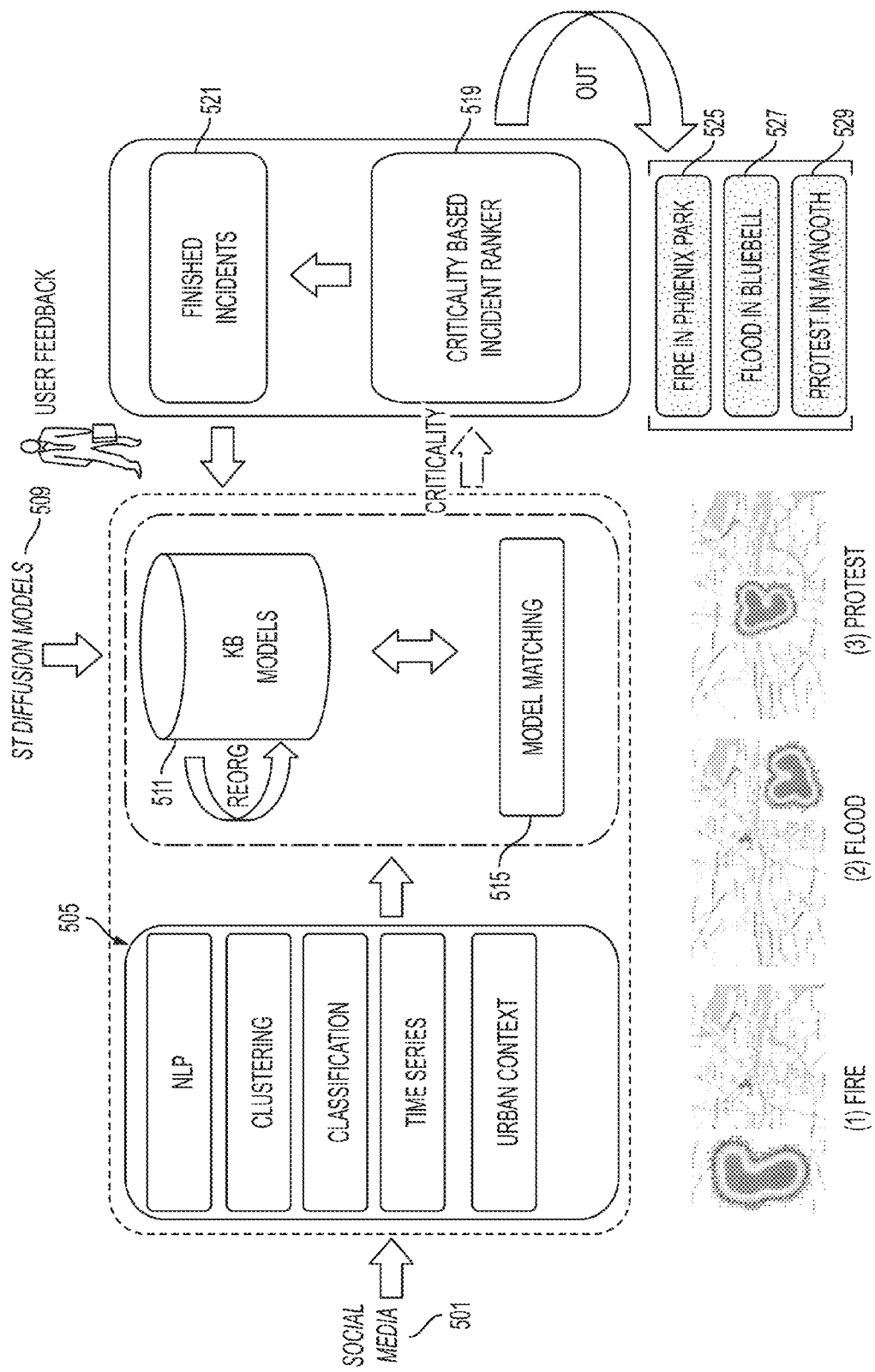
FIG. 5 is an exemplary schematic system architecture in one embodiment.

A schematic system architecture is shown in FIG. 5. In this exemplary schematic, social media data 501 (e.g., tweets, etc.) are provided as input to a computer and processed using NPL, Clustering, Classification, Time series, and/or Urban Context analysis techniques 505. Urban Context is a term that describes the additional information that is available regarding the location from where a tweet was generated (i.e. population density, crime statistics, etc.) This additional information can be used in the form of extra features in data mining and/or statistics algorithms for enhancing the incident detection process. As a result of this processing, a set of incidents are discovered. Subsequently, based on each discovered incident type, one or more spatio-temporal (ST) diffusion models 509 are identified that match the corresponding incident. These diffusion models are stored as part of a knowledge base or KB 511 that is maintained by the system and are matched to real-time incidents with the help of model matching algorithms 515. Subsequently, for each discovered incident, its current state is predicted with the help of the social media, and the incident is matched to a corresponding state in the timeline represented by the assigned diffusion model. This leads to a computation of the current ranking of the discovered incidents as well as a projected ranking that is computed with the help of the matched diffusion models.

User feedback can be provided from the social media to improve the prediction of the current state of an incident and, subsequently, provide a better estimate of the criticality of the incident. For example, a user can tweet about the current state of the incident, such as the number of people congregating at a particular location or the currently perceived importance of this incident (e.g., "the fire seems to be under control"), and this can significantly influence the computation of the criticality of the incident. The Critically Based Incident Ranker 519 is used to rank the discovered events based on their current and their projected criticality. The Criticality Based Incident Ranker refers to the ranking approach that is enforced on the incidents based on their current or predicted criticality scores. Typically, the Critically Based Incident Ranker is the mechanism that is used to produce the rankings shown in FIG. 3 at 301 and 321. The input is a value of criticality for each incident, either the current score or a predicted score, and the output is a ranking such as that of 301 or 321.

Finished Incidents 521 are determined and their related information (in terms of evolution of criticality) becomes part of the knowledge base of the system in order to be used for assessing and ranking future related incidents. Finished incidents are incidents that are no longer important, either because they have ceased to exist or because their criticality score has become too low and is not predicted to increase in the future, so these incidents should not be monitored any longer. The temporal profile of such finished incidents should be maintained in the knowledge base of the system, so that these finished incidents can serve as historical incidents for predicting the evolution of criticality of new monitored incidents. In the example shown in FIG. 5, three incidents are found and ranked: Fire in Phoenix Park 525, Flood in Bluebell 527 and Protest in Maynooth 529.

In one embodiment, the output of the system (step S6, FIG. 2) may be used in public safety and emergency response. Such output, for example, can offer uncertainty-aware ranking of ongoing public safety incidents to help police optimize their resource allocation. Several incidents are not reported through emergency calls to police, e.g., E-911 calls. For example, the evolution of already reported incidents to the police is rarely reported though E-911 calls. In another embodiment, the output of the inventive system (step S6) may be used in general city management. Such output, for example, can be used to discover ongoing events in the city and offer uncertainty-aware ranking of these events based on different scorings that could be of interest to a city manager. Several incidents, such as traffic congestion, concerts, etc., occurring in a city can be automatically identified and simultaneously monitored. In one embodiment, the city manager can react to ongoing incidents and affect their evolution.

An illustration of one embodiment of the novel method follows. In this embodiment, the novel system, using the method described herein, discovers incidents from social media by applying textual and spatio-temporal clustering of tweets. The system detects, for example, a riot. The system calculates, using diffusion models, the score for the incident, e.g., for the riot, and this score may include: number of rioters, geographic extension of the riot, and so on. The system then matches this criticality score with the relevant models in the knowledge base, that is, the system compares the temporal profile of the incident, e.g., riot, with models in the knowledge base, and determines whether a match exists.

In one embodiment, the score and temporal profile computation are performed for every incoming tweet, and the current temporal matching profile, e.g., "curve", for the riot is updated. This current "curve" for the riot is compared to curves, e.g., models, in the knowledge base to determine whether or not an approximate match exists.

The system is then able to make predictions of the evolution of criticality of the incident over time. This evolution is compared against all the other incidents currently monitored, and a ranked list of the incidents is provided, in terms of their predicted evolution of criticality. Accordingly, a list can be generated and, if desired, the list can be displayed. This display not only illustrates current ranking importance but also provides a forecast of future criticality of the incidents, enabling the prediction of when the criticality of an incident will change.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing. The computer readable medium excludes only a propagating signal.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for detecting, monitoring and ranking incidents from social media streams, the method comprising:
   detecting one or more incidents from social media streams and continuously monitoring the one or more incidents;
   calculating a current-score for each of the one or more incidents;
   determining a projected-score indicating an expected evolution for each of the one or more incidents, and using a finished incidents for determining the expected evolution for said each of the one or more incidents;
   ranking the incidents based on the current-scores of the incidents;
   predicting, using a critically based incident ranker, a ranking of the incidents based on the projected-score of the incidents; and
   updating the predicted ranking responsive to a new input detected about the incidents from the social media streams,
   wherein a hardware processor device is configured to perform said detecting one or more
   incidents, calculating a current-score, determining a projected-score, ranking the incidents,
   predicting ranking of the incidents and updating the predicted ranking.

2. The method as in claim 1, wherein the current-score is computed in accordance with characteristics of the incident comprising one or more of social impact assessment, dynamic location of users, human perception, and social network features.

3. The method as in claim 1, wherein the current-score is calculated using one or more diffusion models based on one of a type of the incident, and similar incidents having known evolution.

4. The method as in claim 3, wherein updating the predicted ranking comprises at least a user providing real-time feedback on the incident, said feedback influencing prediction of current state of the incident, and said feedback used with the one or more diffusion models used to calculate the current-score, to update the expected evolution of the incident.

5. The method as in claim 3, wherein updating the predicted ranking is performed automatically based on the expected evolution of the incident based on the one or more diffusion models.

6. The method as in claim 1, further comprising displaying the predicted ranking on a display device.

7. A system for detecting, monitoring and ranking incidents from social media streams, comprising:
   a memory device;
   a display device; and
   a hardware processor coupled to the memory device, the processor configured to:
   detect one or more incidents from social media streams and continuously monitor the one or more incidents;
   calculate a current-score for each of the one or more incidents;
   determine a projected-score indicating an expected evolution for each of the one or more
   incidents, and using a finished incidents for determining the expected evolution for said each of the one or more incidents;
   rank the incidents based on the current-scores of the incidents;
   predict, using a critically based incident ranker, a ranking of the incidents based on the projected-score of the incidents; and
   update the predicted ranking responsive to a new input detected about the incidents from the social media streams.

8. The system as in claim 7, wherein the current-score is computed in accordance with characteristics of the incident comprising one or more of social impact assessment, dynamic location of users, human perception, and social network features.

9. The system as in claim 7, wherein the current-score is calculated using one or more diffusion models based on one of a type of the incident, and similar incidents having known evolution.

10. The system as in claim 9, wherein updating the predicted ranking comprises at least a user providing real-time feedback on the incident, said feedback influencing prediction of current state of the incident, and said feedback used with the one or more diffusion models used to calculate the current-score, to update the expected evolution of the incident.

11. The system as in claim 9, wherein update the predicted ranking is performed automatically based on the expected evolution of the incident based on the one or more diffusion models.

12. The system as in claim 7, further comprising a display device configured to display the predicted ranking.

13. A computer program product for detecting, monitoring and ranking incidents from social media streams, the computer program product comprising a non-transitory storage medium readable by a processing circuit and storing instructions run by the processing circuit for performing method steps for dynamic, semi-supervised clustering executed on a hardware processor, comprises:
   detecting one or more incidents from social media streams and continuously monitoring the one or more incidents;
   calculating a current-score for each of the one or more incidents;
   determining a projected-score indicating an expected evolution for each of the one or more incidents, and using a finished incidents for determining the expected evolution for said each of the one or more incidents;
   ranking the incidents based on the current-scores of the incidents;
   predicting, using a critically based incident ranker, a ranking of the incidents based on the projected-score of the incidents; and
   updating the predicted ranking responsive to a new input detected about the incidents from the social media streams.

14. The computer program product as in claim 13, wherein the current-score is computed in accordance with characteristics of the incident comprising one or more of social impact assessment, dynamic location of users, human perception, and social network features.

15. The computer program product as in claim 13, wherein the current-score is calculated using one or more diffusion models based on one of a type of the incident, and similar incidents having known evolution.

16. The computer program product as in claim 15, wherein updating the predicted ranking comprises at least a user providing real-time feedback on the incident, said feedback influencing prediction of current state of the incident, and said feedback used with the one or more diffusion models used to calculate the current-score, to update the expected evolution of the incident.

17. The computer program product as in claim 15, wherein updating the predicted ranking is performed automatically based on the expected evolution of the incident based on the one or more diffusion models.

18. The computer program product as in claim 13, further comprising displaying the predicted ranking on a display device.

\* \* \* \* \*